United States Patent Office 3,756,961
Patented Sept. 4, 1973

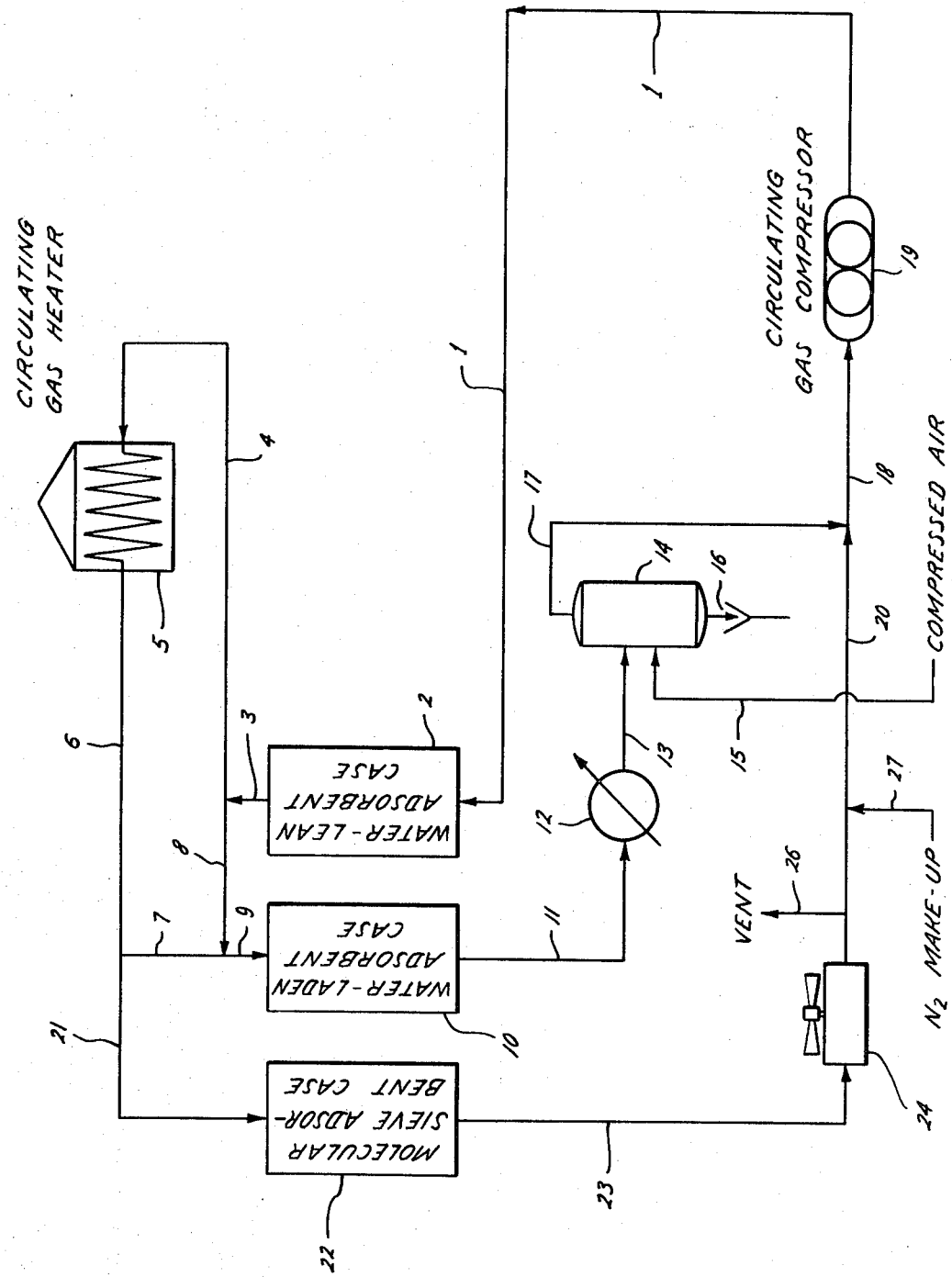

---

3,756,961
REGENERATION OF MOLECULAR SIEVES WITH REGENERATION OF SOLID WATER ADSORBENTS
James O. Francis and Randlow Smith, Houston, Tex., assignors to Texaco Inc., New York, N.Y.
Filed June 2, 1971, Ser. No. 149,275
Int. Cl. B01j 11/04; R01j 11/72
U.S. Cl. 252—419                5 Claims

ABSTRACT OF THE DISCLOSURE

A process for regenerating a bed of coke-containing crystalline zeolitic molecular sieves by continuously passing a closed-loop flow of hot, oxygen-containing inert gas through the molecular sieve bed, wherein water in the circulating gas stream is maintained below a preselected concentration.

BACKGROUND OF THE INVENTION

Field of the invention

This invention relates to a method for regenerating crystalline zeolitic molecular sieves by means of controlled oxygen burn-off of carbonaceous deposits employing a hot, oxygen-containing gas. More particularly, it relates to a process for controlling the partial pressure of water vapor present in the gas employed to reactivate the molecular sieves.

Prior art

Methods for burning carbonaceous deposits from crystalline zeolitic aluminosilicate molecular sieves which have been employed in hydrocarbon separation processes are well known in the prior art. For instance see Mays et al. U.S. Pat. 3,069,362, and Mays et al. U.S. Pat. 3,069,363.

It is also well known that water vapor in contact with crystalline zeolitic aluminosilicate molecular sieves under conditions of high temperature and water partial pressures from about 0.15 p.s.i.a. and higher will destroy a portion of the crystalline structure of such molecular sieves. The effect of water vapor upon such molecular sieves is described in the above referenced U.S. patents.

The common practice for burning carbonaceous deposits from a bed of molecular sieves is to continuously circulate a stream of inert gas through the molecular sieve bed in closed loop fashion. The inert gas stream is employed to convey oxygen to the molecular sieve bed and to convey the heat of combustion and products of combustion, including water, away from the molecular sieve bed. In order to prevent damage to the molecular sieve bed by high water vapor concentrations, it is known to remove water vapor from the inert gas stream before returning the inert gas to the molecular sieve bed inlet. Commonly, water vapor is removed from the inert gas stream by flowing said inert gas stream through a case of water-lean water adsorbent wherein substantially all the water may be adsorbed from the inert gas stream into the water adsorbent. In time the water adsorbent becomes laden with water. It is known to replace the case of water-laden water adsorbent with a fresh case of water-lean water adsorbent and to regenerate the water-laden water adsorbent in preparation for its subsequent use in the burning process.

The known methods for regenerating or desorbing water from water-laden water adsorbent require a water desorbing system comprising a gas compressor and a heater. Such known methods also require the use of a water desorbing gas. In the known methods, the water desorbing system and gas are separate from and in addition to the system and inert gas employed to burn carbonaceous materials from the molecular sieve bed. Commonly, a water desorbing gas, such as air or nitrogen, is compressed sufficiently to drive the water adsorbing gas through the case of water-laden water adsorbent. This compressed, water-adsorbing gas is then heated to a temperature such that the gas has substantial capacity for desorbing water from the water-laden water adsorbent. That is, the gas is heated to a temperature such that the water vapor concentration in the gas entering the water-laden water adsorbent is substantially below the saturation concentration of water vapor in such gas at the temperature and pressure employed.

The water desorbing gas is sometimes used on a once through basis, and then vented, such as where compressed, heated air is used as the desorbing gas. Otherwise, the water desorbing gas is recirculated in the water desorbing process. Where the water desorbing gas is recirculated, the hot, water-containing gas is recovered from the beds of water adsorbent and is cooled to condense water therefrom. This cooled water adsorbing gas is then recovered free of condensed water and is returned to the inlet of the gas compressor.

SUMMARY OF THE INVENTION

According to the present invention, an improved process is provided for regenerating a coke-containing crystalline zeolitic aluminosilicate molecular sieve bed which has been used in a hydrocarbon separation process to restore the selective adsorptive capacity to such molecular sieve bed. The regeneration process of the present invention comprises a coke-burning step wherein an inert gas stream is continuously circulated in a closed-loop flow through the molecular sieve bed. The inert gas stream is utilized to convey oxygen and heat for sustaining the coke burning to the molecular sieve bed and is utilized to convey the heat of combustion and the products of combustion produced by the coke burning from the molecular sieve bed. The water product of combustion from the coke burning is removed from the regeneration process by flowing the circulating inert gas stream through to a water-lean water adsorbent wherein the water of combustion is adsorbed and thereby removed from the process. Now according to the improvement of the present invention, it has been discovered that the circulating inert gas stream may also be utilized to regenerate a waterladen water adsorbent to prepare such water adsorbent for subsequent water adsorbing use in the regeneration process.

By following the process of the present invention, the separate system comprising a gas compressor and gas heater and the separate water desorbing gas employed in the prior art processes for desorbing water from a water laden water adsorbent may be eliminated. The elimination of the separate system and the separate water desorbing gas from the process for regenerating molecular sieve beds results in a process simpler than the processes known to the prior art.

One embodiment of the present invention comprises continuously supplying inert gas containing from about 0.5 to about 10 mol. percent oxygen, from about 0 to about 20 mol. percent $CO_2$, from about 0 to about 10 mol. percent CO, and less than about 200 p.p.m. water vapor, at a temperature from about 825° F. to about 950° F. and at a pressure of from about 50 to about 150 p.s.i.g. to a bed of coke containing crystalline zeolitic aluminosilicate molecular sieves; burning coke from said molecular sieve bed; continuously recovering inert gas containing the products of coke combustion from said molecular sieve bed wherein the water vapor partial pressure of the recovered inert gas is maintained less than 0.15 p.s.i.a.; venting a portion of said recovered inert gas sufficient to maintain the system material balance; adsorbing water vapor from said inert gas mixture in a case of water-lean water adsorbent; heating said dried inert gas stream to a temperature between about 950° F. and about 1000° F.; conveying a major portion of said hot, dried inert gas stream to the inlet of said molecular sieve bed; flowing a slip stream of said inert gas stream through a case of water-laden water adsorbent at a temperature of from about 400° F. to about 650° F. to desorb water from said water-laden water adsorbent; condensing water from the water containing slip stream; mixing oxygen with the non-condensed slip stream in an amount sufficient to supply oxygen to the coke burning step of the molecular sieve regeneration; and returning this slip stream to the inlet of the case of water-lean water adsorbent.

BRIEF DESCRIPTION OF THE DRAWING

The attached drawing is a schematic flow diagram illustrating a preferred embodiment of the invention.

DETAILED DESCRIPTION OF THE INVENTION

The process of this invention is applicable to the reactivation of such natural and synthetic hydrated metal aluminosilicate zeolitic materials as are described in Mays et al. U.S. Pat. 3,069,353. For instance, Zeolite A, Zeolite D, Zeolite T, Zeolite X, Erionite, Zeolite L, Zeolite Y, Chabozite, faujasite and mordenite.

Crystalline zeolite molecular sieves may be used in a wide variety of processes involving the separation of carbon-containing compounds from mixtures with other compounds. For example, it is well known that normal paraffins may be separated from mixtures with other hydrocarbons because the normal paraffins are preferentially adsorbed within the pores of certain molecular sieves. Also, olefins may be recovered from refinery gas streams, acetylenic compounds may be removed from olefin and sulfur-, oxygen-, and nitrogen-containing compounds may be separated from hydrocarbon compounds.

Crystalline zeolitic molecular sieves exhibit a selectivity based on the size, degree of unsaturation, shape and polarity and polarizability of the adsorbate molecule. Among these adsorbate molecules whose size and shape are such as to permit adsorption by the zeolite, a strong preference is shown toward those that are polar, polarizable and unsaturated.

The size and shape of the adsorbate molecule determines whether and to what degree they will be adsorbed by the zeolite. For example, the interstitial channels of calcium zeolite A are such that at their narrowest points molecules with critical dimensions greater than approximately 5 angstrom units will not readily enter the channels. The term "critical dimensions" may be defined as the maximum dimension of the minimum projected cross-section of the adsorbate molecule. The term may also be defined as the diameter of the smallest cylinder which will accommodate a model of the adsorbate molecule. As a result of this adsorption selectivity based upon "critical dimensions" of the molecules, molecular sieves are particularly useful for separating straight-chain aliphatic hydrocarbon molecules from branch-chained aliphatic, cycloaliphatic and aromatic hydrocarbon molecules.

In many processes utilizing crystalline zeolitic molecular sieves, carbonaceous material which is non-volatile at the operating conditions for either adsorption or desorption is deposited on the surface and within the pores of the molecular sieve. The deposit of non-volatile carbonaceous matter may result for example, form polymerization of unsaturated compounds, from isomerization, or from thermal decomposition of any carbon-containing compound which comes in contact with the molecular sieves. This carbonaceous matter which is non-volatile at the operating temperature will be referred to hereinafter as coke. The deposition of coke results in reduction in the adsorption capacity of the molecular sieve, consequently, the molecular sieve must be reactivated by removal of the coke deposits. The moclecular sieves may contain as much as about 7 wt. percent coke before their adsorptive capacity is essentially lost. Molecular sieves for which the regeneration process of the present invention is particularly suitable may contain from about 0.5 to about 7 wt. percent, or more coke. It is difficult to reduce the coke content of the molecular sieves much below about 0.5 wt. percent according to the regeneration process contemplated in the present invention, and 0.2 wt. percent coke is essentially the minimum value which may be obtained.

The reactivation of a bed of molecular sieves by removal of coke deposits must be carried out in such a manner that the highly selective adsorptive capacity of the sieve is retained and no substantial damage is done to the crystal structure of the sieve. Since the selective adsorptive properties of crystalline zeolitic molecular sieves depend on the uniformity of the pores in the crystal lattice, any substantial damage to the essential crystal structure destroys the selective properties of the sieve.

The several species of crystalline zeolitic molecular sieves listed hereinabove may be continuously maintained in an inert atmosphere and at temperatures up to about 1290° F. without substantial damage to the crystal structure. Above about 1325° F. the crystal structure of these sieves is rapidly and almost completely destroyed. The crystal structure of these molecular sieves may also be substantially damaged at temperatures below about 1290° F. by contact with an atmosphere containing appreciable quantities of water vapor. Therefore, the water vapor concentration in contact with the molecular sieve during reactivation must be carefully controlled.

It is within the contemplation of the present invention that the coke containing molecular sieve may be first subjected to a preheat step wherein a dry inert gas is flowed across the molecular sieve at a temperature from about 600° F. to about 1050° F. for a period of time of from less than two hours to about 24 hours. Preferably, the preheat step is carried out for about twelve hours or less at between about 800° F. to about 1000° F. During the preheat step, any volatile hydrocarbons are removed from the molecular sieve bed. Additionally, in the preferred temperature range, the hydrogen content of the coke is substantially reduced to a hydrogen carbon ratio of about 1/1. At the end of the preheat step, the burn cycle is begun.

In the burn cycle, an oxygen-containing inert gas stream is flowed across the preheated molecular sieve bed at a feed gas temperature from about 500° F. to about 1000° F., at a pressure from about 1 to about 10 atm., and at a superficial mass velocity of from about 20 to about 1500 lb./hr. (ft.$^2$). The oxygen content of the inert gas may be varied between about 0.1 and about 10 mol percent. The coke is burned or oxidized by the oxygen contained in the feed gas. The temperature at which the coke burns is a function of feed gas inlet temperature, coke present on the molecular sieve, and oxygen concentration in the feed gas. The maximum burning temperature is limited to about 1150° F. to ensure that portions of the molecular sieve bed do not exceed the critical temperature of about 1290° F. above which the crystalline structure begins to disintegrate.

The temperature of the oxygen containing inert gas stream which flows through the molecular sieve bed must be sufficiently high to initiate and maintain combustion of the coke. The minimum practical temperature at which the coke burning may be initiated is about 800° F. Once the coke-burning reaction is initiated, the temperature of the inert gas stream may be reduced, provided the temperature in the molecular sieve bed where coke is burning is maintained at about 800° F. or higher. Temperatures of the gas stream at the inlet of the molecular sieve bed are sufficiently high to ensure that the coke-burning reaction is maintained and are sufficiently low such that the maximum coke-burning temperature of about 1150° F. is not exceeded.

Pressures below 1 atmosphere are operable but are not desirable because of the danger of leakage of air into the system. Pressures above 10 atmospheres may lead to excessively high coke-burning rates and make it more difficult to control the coke-burning temperatures. Preferably, the operating pressure may be between about 3 atm. and about 5 atm. wherein a relatively fast coke-burning rate may be obtained.

Superficial mass velocities below about 20 lb./hr.) (sq. ft.) require very long times for coke burn-off while superficial mass velocities about 1500 lb./hr. (sq. ft.) lead to high pressure drops and high power requirements for maintaining the flow.

Throughout the coke-burning cycle, the inert gas is continuously circulated through the molecular sieve bed. This inert gas is employed to convey the oxygen necessary for burning the coke into the molecular sieve bed, and to convey the heat of combustion and the products of combustion such as water, carbon dioxide, and carbon monoxide out of the molecular sieve bed. Additionally, at the beginning of the coke-burning cycle the inert gas may be used to heat the molecular sieve bed to the desired coke combustion temperature. Such an inert gas may be any gas which is non-reactive at the regenerating conditions. Nitrogen is most often chosen as the inert gas, although it is known that other inert gases such as helium and the noble, mono-atomic gases can be used with equal facility.

Commonly the amount of inert gas necessary to regenerate a bed of molecular sieves is conserved by circulating the inert gas in closed loop flow. That is, the inert gas containing the products of combustion and substantially depleted in oxygen is recovered from the molecular sieve bed for return as a major component of the circulating gas entering the molecular sieve bed.

Oxygen required for burning the coke may be supplied to the inert gas in any convenient form such as molecular oxygen, or, where the inert gas is nitrogen, as enriched air, or air. It is particularly advantageous to add the oxygen required for coke-burning in the form of compressed air when the circulating inert gas is nitrogen. When the oxygen is added in the form of compressed air, a substantial amount of nitrogen is also added to the system and to maintain a system balance a portion of the circulating gas must be vented.

The water vapor concentration in contact with the molecular sieve must be controlled to prevent damage to the sieve at the temperatures encountered during the coke burn-off process. The effect of water vapor upon the crystalline zeolite molecular sieves is well described in such patents as Mays et al. U.S. 3,069,362 and Mays et al. U.S. 3,069,363. The effect of water vapor upon the crystalline zeolitic molecular sieves is a permanent loss in adsorptive capacity. The degree of loss in adsorptive capacity is determined by the water vapor concentration in the gas flowing over the molecular sieve bed, temperature of the bed, and the total time for which the bed is exposed to the water vapor. As the adsorptive capacity loss due to water vapor is permanent, each succeeding regeneration of the molecular sieve results in additional loss in adsorptive capacity.

The frequency of regeneration of the molecular sieves varies widely with the separation process for which the molecular sieves are employed. Some light hydrocarbon separation processes may require regeneration as infrequently as every six months. Separation processes for recovering $C_8$–$C_{14}$ straight chain hydrocarbons from mixtures thereof with non-straight chain hydrocarbons may require regeneration of the molecular sieves as frequently as 15 to 180 days. In the latter case, where the frequency of regeneration is in terms of days, the loss in adsorptive capacity upon regeneration must be held to a minimum. In such cases it is desirable to maintain the maximum water vapor pressure in the gas in contact with the molecular sieves during regeneration below about 0.15 p.s.i.a., and in no case is it practical to allow the water vapor pressure to exceed about 4 p.s.i.a.

Water vapor may come from two principal sources, (1) the gas used in the preheating and burn-off steps and (2) water resulting from the reaction of the oxygen and/or carbon dioxide with the hydrogen containing material in the coke. The amount of water vapor in contact with the molecular sieve bed may be conveniently measured by determining the water vapor concentration in the gas stream at the outlet of the molecular sieve bed.

The water vapor resulting from the reaction of oxygen with the hydrogen containing materal in the coke may be controlled by regulating the oxygen concentration in the inert gas circulated through the molecular sieve bed during the coke-burning step. A preferred method for controlling the water vapor partial pressure of the inert gas in contact with the molecular sieve bed is to measure the water vapor partial pressure in the gas stream at the outlet of the molecular sieve bed and adjust the oxygen concentration entering the molecular sieve bed to maintain the measured water vapor partial pressure below a pre-selected value, preferably below about 0.15 p.s.i.a.

Water vapor in the inert gas stream entering the molecular sieve bed may be controlled by passing the inert gas stream recovered from the molecular sieve bed through one or more cases of water-lean water adsorbent before the inert gas stream is recycled to the inlet of the molecular sieve bed. Enough cases of water adsorbent are provided so that while some of the cases are being used to adsorb water from the inert gas, other cases are being treated to desorb water therefrom in preparation for their subsequent use in the process. In this manner, the cases of water adsorbent are used to adsorb water from the inert gas and, upon saturation, the use of these cases is discontinued and water is desorbed from them in preparation for their use again to adsorb water from the inert gas.

In the present invention, a process for burning coke from a bed of molecular sieves employed in the separation of hydrocarbons is disclosed, wherein a stream of inert gas is continuously circulated through the molecular sieve bed in closed-loop fashion, wherein the circulating inert gas stream is dried by passing it through a bed of water-lean water adsorbent prior to circulating the gas stream through the molecular sieve bed, and wherein an improved method of regenerating a bed of water-laden water adsorbent is incorporated, which method comprises flowing a slip stream of the dried inert gas stream through a case of water-laden water adsorbent to desorb water therefrom; condensing a major portion of the desorbed water from the slip stream; and returning the partially dewatered slip stream to the inlet of the water-lean water adsorbent.

The method of the present invention employs cases of water adsorbent in parallel arrangement. Cases of water-lean water adsorbent are utilized to dry the circulating inert gas while cases of water-laden water adsorbent are being regenerated. Any water adsorbent which is amenable to regeneration with a hot gas may be employed. Examples of such adsorbents are silica gel, anhydrous alumina and molecular sieves. Preferably an acid resistant potassium substituted aluminosilicate zeolitic molecular sieve adsorbent is employed. Acid resistance is preferred because the carbon dioxide in the recirculating gas and the adsorbed water form carbonic acid within the adsorbent. The potassium substitution of the aluminosilicate provides a zeolitic molecular sieve with pore openings of about 3 angstrom units, which are proper for the adsorption of water. Additionally, the aluminosilicate zeolitic molecular sieves will withstand relatively high temperatures (up to about 1150° F.), thereby allowing more rapid regeneration.

The operation of the method of the present invention proceeds by flowing a circulating inert gas stream containing water from the outlet of the regenerating molecular sieve bed into the inlet of a case of water-lean water adsorbent at a temperature below about 200° F., preferably below about 140° F. and at the desired regeneration system operating pressure of between about 1 atm. and about 10 atm. The circulating inert gas recovered from the outlet of the molecular sieve bed is conveniently cooled by any conventional heat exchange means such as a fin-fan exchanger. In the water-lean water adsorbent case, water is adsorbed from the circulating inert gas stream. As the dried circulating inert gas leaves the water-lean water adsorbent case its water vapor content is below about 200 p.p.m. A major portion of the dried circulating inert gas may then be heated by any convenient heating means such as a gas fired heater, to the desired inlet temperature for the regenerating molecular sieve bed; preferably, as stated hereinbefore, between about 800° F. and about 1000° F. A slip stream of the dried circulating inert gas is heated to a temperature of from about 400° F. to about 650° F. This heated slip stream is passed into the inlet of a case of water-laden water adsorbent wherein the slip stream desorbs water from the water adsorbent. The slip stream, containing water desorbed from the water-laden water adsorbent is removed from the outlet of the water-laden water adsorbent. A major portion of the water is condensed from the slip stream. Any conventional means for condensing the water may be employed, such as by cooling the slip stream to a temperature below about 100° F. in a water cooled condenser. The condensed water is separated from the slip stream, and the partially dewatered slip stream is returned to the inlet of the water-lean water adsorbent along with the water containing circulating inert gas stream.

The major portion of the dry, heated circulating inert gas is passed from the heater outlet to the inlet of the molecular sieve bed. The oxygen necessary for burning coke from the regenerating molecular sieve bed may be added to the circulating inert gas stream at any point ahead of the inlet to the molecular sieve bed. However, when compressed air is used as the oxygen source, it is particularly advantageous to added the compressed air to the cool slip stream leaving the condenser. In this manner, any condensed water present in the compressed air is separated along with the condensed water from the cooled slip stream. Also, the compressed air will pass through the case of water-lean water adsorbent, thereby allowing adsorption of water vapor from the compressed air.

Preferably, the flow rate and temperature of dry, hot, slip stream to the water-laden water adsorbent being regenerated is adjusted to ensure that regeneration is complete before the water-lean water adsorbent which is adsorbing water from the circulating inert gas stream becomes saturated and allows the water vapor content of the dried circulating inert gas stream to exceed about 200 p.p.m. The exact volume and temperature of gas required to regenerate a water-laden water adsorbent will vary according to the particular situation and may easily be established by one skilled in the art. In one example, the requirements for completely regenerating one case of water-laden water adsorbent before the case of water-lean water adsorbent reached its water adsorbing capacity was as follows:

A total gas flow of 8,500 lb./hr. of circulating inert gas at a temperature of 100° F. and a pressure of 80 p.s.i.a. with a water vapor concentration of 0.15 p.s.i.a. was treated in a case of water-lean water adsorbent to reduce the water content of the circulating inert gas to a value below 200 p.p.m. In order to regenerate a case of water-laden water adsorbent before the case of water-lean water adsorbent on the adsorption cycle reached its adsorptive capacity, it was necessary to pass 2,200 lb./hr. of the dried circulating gas at a temperature of 650° F. through the case of water-laden water adsorbent. Both cases of water adsorbent employed 1200 lbs. of potassium substituted aluminosilicate zeolitic molecular sieves as adsorbent.

Accordingly in the preferred embodiment of the present invention, when the water adsorbent cases on the adsorption cycle reach their water adsorption capacity, the water adsorbent cases on the regeneration cycle will be regenerated. At that point, the functions of the cases of water adsorbent will be reversed, with the regenerated cases being used in the adsorption cycle and with the water-laden cases being regenerated. This cycle of adsorption and regeneration of the cases of water adsorbent is continued throughout the coke-burning step of the molecular sieve regeneration process.

It has been noted in the operation of a coke-burning step, that carbonaceous deposits occur upon the water adsorbent. These deposits reduce the adsorptive capacity of the water adsorbent. The exact source of these carbonaceous deposits is unknown, but it is surmised that they comprise volatilizable hydrocarbons which are not completely removed prior to the initiation of the coke-burning step and are not completely burned during the molecular sieve regeneration process.

Accordingly, one embodiment of the present invention provides a method for restoring the water adsorbing capacity of a water adsorbent by removing these carbonaceous deposits from the water adsorbent during the regeneration cycle. This method comprises burning the carbonaceous deposits from the water adsorbent with oxygen added to the inert gas slip stream employed to desorb water from the water-laden water adsorbent after the adsorbent has been regenerated to remove water. Oxygen is conveniently added to the circulating inert gas stream before the slip stream is withdrawn. Therefore the oxygen concentration in the slip stream will be the same as the oxygen concentration in the circulating inert gas stream supplied to the inlet of the molecular sieve bed. When oxygen is supplied to the slip stream in this manner, the oxygen concentration may vary from about 0.1 mol percent to about 10 mol percent in accordance with the oxygen demands of the molecular sieve bed being regenerated. Oxygen may be separately supplied to the slip stream in concentrations above about 10 mol percent if desired, although there is no particular advantage as an oxygen concentration sufficient to burn coke from the bed of molecular sieves being regenerated has been found adequate to burn the carbonaceous deposits from a bed of water adsorbent. The temperature necessary to initiate combustion of the carbonaceous deposits has been found to be about 800° F. It is therefore necessary to heat the oxygen-containing slip stream to at least about 800° F. to burn the carbonaceous deposits from a case of water adsorbent. Preferably the slip stream is heated to a temperature of from about 800° F. to about 850° F. Temperatures above about 850° F. are unnecessary to initiate and sustain combustion of the carbonaceous deposits, and such temperatures increase the likelihood that the water adsorbent will be heat damaged. Particularly when a crystalline zeolitic molecular sieve such as potassium substituted sodium-aluminosilicate is employed as water adsorbent, unnecessarily high temperatures should be avoided. The destruction of the crystalline structure of such a molecular sieve by water is increased with increasing temperature and water vapor partial pressure in contact with the molecular sieve. The adsorbent used for water removal must be regenerated to remove water to insure that the partial pressure of water in contact with the molecular sieve being regenerated is kept below about 4 p.s.i.a. It has been found, however, when temperatures in the preferred range of from about 800° F. to about 850° F. are employed and below .15 to 4 p.s.i.a. water vapor partial pressure, the water vapor damage to such a potassium substituted molecular sieve being regenerated is slight. By following the regeneration method of this embodiment of the present invention, the water adsorption capacity of a water-laden, carbonaceous material containing water adsorbent may be substantially restored.

One advantage of the improvement of the present invention over the methods for drying the recirculating inert gas stream disclosed in the prior art, is that it is possible to regenerate the water-laden water adsorbent employing the same equipment as is required for the coke burning step in the process for regenerating the molecular sieve bed. The additional heater and gas compressor generally employed to provide hot gas to regenerate the driers is eliminated.

Another advantage of the improvement of the present invention is that carbonaceous deposits which collect upon the water adsorbent during the coke-burning cycle may be conveniently removed by burning these carbonaceous deposits during a regeneration step wherein water is desorbed from a water-laden adsorbent. These carbonaceous deposits may be burned employing the same equipment as is required for burning coke from the molecular sieve bed.

DETAILED DESCRIPTION OF THE DRAWING

This invention will now be described more fully with reference to the accompanying drawings which shows a schematic flow diagram of a specific embodiment representative of the invention.

A circulating inert gas stream at a temperature of about 100° F., a pressure of about 61 p.s.i.g., containing about 2200 p.p.m. water vapor and about 0.5 mol percent oxygen flows from line 1 into a case of water-lean water adsorbent 2. Within the case of water-lean water adsorbent 2, the water content of the circulating inert gas is reduced to less than 200 p.p.m. From the case of water-lean water adsorbent 2, the circulating inert gas is recovered via line 3. From line 3, a major portion of the dried circulating inert gas passes via line 4 into a gas heater 5 wherein the circulating inert gas is heated to about 975° F. From the heater 5, hot, dry circulating inert gas is recovered via line 6. From line 6, a minor portion of the heated, dry circulating inert gas flows into line 7. From line 3, a minor portion of the cool, dry circulating inert gas flows into line 8. The hot, dry recirculating gas stream from line 7, and the cool, dry recirculating gas stream from line 8 flow into line 9 wherein the two gas streams mix to form a slip stream of dry circulating gas at a temperature of about 650° F.

From line 9, the 650° F. slip stream flows into a case of water-laden water desorbent 10, wherein the slip stream desorbs water from the water-laden water adsorbent. From the case of water-laden water adsorbent 10, the slip stream containing desorbed water is transferred via line 11 to a condenser 12. In the condenser 12, the slip stream is cooled to 100° F., and a major portion of the desorbed water is condensed. The condensed water and partially dewatered slip stream flow from the condenser 12 via line 13 to a knock-out pot 14. Compressed air enters the knockout pot 14 via line 15. In the knock-out pot 14, condensed water is separated and withdrawn via line 16. Also in the knock-out pot 14, the compressed air mixes with the partially dewatered slip stream to form an oxygen containing slip stream. From the knock-out pot 14, the oxygen containing slip stream is removed via line 17 to line 18 where it mixes with an effluent gas from a coke burning step (as hereinafter described).

From line 6, the major portion of the hot, dry circulating inert gas stream enters line 21 as regeneration gas for a bed of molecular sieve adsorbent. In line 21 the regeneration gas loses heat by convection and radiation. From line 21 the regeneration gas at a temperature of about 825° F. enters a sieve case 22 containing a bed of molecular sieve adsorbent. The sieve comprises crystalline zeolite molecular sieves employed in the separation of straight chain aliphatic hydrocarbons from non-straight chain hydrocarbons, which contain coke deposited on the surfaces and in the pores of the molecular sieves. In the sieve case 22, the regeneration gas contacts the molecular sieve bed and therein the coke is burned with oxygen contained in the regeneration gas. The temperature rise across the coke-burning zone is about 125° F. and, as the regeneration gas contacts the molecular sieve bed at 825° F. the temperature in the coke-burning zone is 950° F.

From the sieve case 22, an effluent gas comprising combustion products from the coke-burning zone and non-combusted inert gas is removed via line 23. From line 23 the effluent gas enters cooler 24 wherein it is cooled to about 140° F. From the cooler 24, the cooled effluent gas is removed via line 20. From line 20, a minor portion of the effluent gas is vented via line 26 to maintain the system pressure which otherwise would increase due to nitrogen introduced in the air stream 15. Make-up nitrogen may be added to the regeneration process as required via line 27. From line 20, the effluent gas stream enters line 18, as has hereinabove been described. In line 18 the effluent gas stream and the oxygen-containing slip stream mix to form the circulating inert gas stream. From line 18 the circulating inert gas stream flows into booster compressor 19. From the booster compressor 19 the circulating inert gas stream enters line 1. From line 1, the circulating inert gas stream enters drier case 2 as has hereinbefore been described.

It will be recognized that the drawing is schematic, and many conventional items of equipment commonly used in a plant are not shown, for example, pumps, valves, instrumentation, etc. and the necessary additional equipment can be supplied by one skilled in the art, as needed.

To one skilled in the art, it will be evident that many variations and modifications can be practiced in view of the foregoing disclosure that will come within the spirit and scope of the invention.

We claim:

1. In a process wherein by-product coke is deposited in a bed of water-sensitive, temperature-sensitive crystalline zeolitic molecular sieve during a hydrocarbon separation step, wherein coke is periodically burned from the molecular sieve bed during a combustion step by the continuous closed loop flow through the molecular sieve bed of a gas stream which at the inlet thereof contains from about 0.1 to about 10.0 mol percent oxygen, wherein water of combustion is continuously removed after combustion by passing the gas through a water-lean case of on-stream solid water adsorbent prior to recycle and wherein unburned carbonaceous material from the molecular sieve bed accumulates in the on-stream water adsorbent during at least a portion of the carbon burning step, the improvement for regenerating an off-stream case of water-laden, carbonaceous material containing solid water adsorbent for subsequent use in the process which comprises:

(A) continuously passing a slip stream of the dewatered, oxygen containing gas stream through the off-stream case of solid water adsorbent;

(B) maintaining the slip stream temperature from about 400° F. to about 650° F. until substantially all the water from the off-stream case of water adsorbent is transferred to the slip stream; then (C) increasing the slip stream temperature to about 800° F. to 850° F. to burn the carbonaceous materials from the dewatered off-stream case of water adsorbent;

(D) cooling the slip stream leaving the off-stream case of water adsorbent to a temperature below about 100° F.; and (E) returning the cooled slip stream to the inlet of the on-stream case of water adsorbent.

2. The process of claim 1 wherein the solid water adsorbent comprises an acid resistant crystalline zeolitic molecular sieve.

3. The process of claim 1 wherein the solid water adsorbent comprises an acid resistant potassium substituted hydrogen aluminosilicate crystalline zeolitic molecular sieve.

4. The process of claim 1 wherein oxygen for burning coke from the molecular sieve bed is added to the partially dewatered slip stream prior to returning said slip stream to said on-stream bed of solid adsorbent.

5. The process of claim 4, including: heating a major portion of the circulating gas stream to a temperature in the range of from about 800° F. to about 1050° F. sufficient to maintain the coke burning in the molecular sieve bed; and mixing a portion of such heated circulating gas with an unheated minor portion of the circulating gas stream to form said slip stream having a temperature in the range of from about 400° F. to about 650° F.

References Cited

UNITED STATES PATENTS

| | | | |
|---|---|---|---|
| 3,069,362 | 12/1962 | Mayes et al. | 252—416 |
| 3,069,363 | 12/1962 | Mayes et al. | 252—416 |
| 3,649,559 | 3/1972 | Cooper | 252—419 |
| 3,046,235 | 7/1962 | King et al. | 252—411 R |
| 3,498,025 | 3/1970 | Bednarski | 55—33 |
| 2,944,627 | 7/1960 | Sharstrom | 55—33 |

DANIEL E. WYMAN, Primary Examiner

P. E. KONOPKA, Assistant Examiner

U.S. Cl. X.R.

55—33; 252—411, 416